(12) United States Patent
Boler et al.

(10) Patent No.: US 7,979,315 B2
(45) Date of Patent: Jul. 12, 2011

(54) VIRTUAL FEATURES OF PHYSICAL ITEMS

(75) Inventors: Sabrina D. Boler, Seattle, WA (US);
Dane T. Storrusten, Seattle, WA (US);
Nicole Alexandra Coddington, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1152 days.

(21) Appl. No.: 11/686,286

(22) Filed: Mar. 14, 2007

(65) Prior Publication Data

US 2008/0229194 A1 Sep. 18, 2008

(51) Int. Cl.
*G06Q 30/00* (2006.01)
(52) U.S. Cl. ...................... 705/26.1; 705/27.1
(58) Field of Classification Search ............... 705/26, 705/37, 26.1, 27.1
See application file for complete search history.

(56) References Cited

U.S. PATENT DOCUMENTS

| 6,641,037 | B2 | 11/2003 | Williams |
| 6,744,938 | B1 | 6/2004 | Rantze et al. |
| 6,965,872 | B1 | 11/2005 | Grdina |
| 2001/0044751 | A1 | 11/2001 | Publiese, III et al. |
| 2005/0119906 | A1 | 6/2005 | Lee et al. |
| 2005/0267819 | A1 | 12/2005 | Kaplan |
| 2006/0100930 | A1 | 5/2006 | Novak-Torre |
| 2006/0190344 | A1 | 8/2006 | Sang et al. |
| 2007/0266185 | A1* | 11/2007 | Goddi et al. ................ 710/8 |

FOREIGN PATENT DOCUMENTS

WO WO9501703 1/1995

OTHER PUBLICATIONS

Microsoft Blog, Microsoft Surface finds home in AT&T stores, Apr. 1, 2008, downloaded from Google on the Internet on Sep. 26, 2010, 2 pages.*
Spenke, Michael, et al., "FOCUS: The Interactive Table for Product Comparison and Selection", UIST '96 Proceedings of the ACM Symposium on User Interface Software and Technology, Seattle, Nov. 6-8, 1996, pp. 1-10.
Roth, Steven, F., et al., "Towards an Information Visualization WorkSpace: Combining Multiple Means of Expression", Human-Computer Interaction Journal, vol. 12, Nos. 1 & 2, 1997, pp. 131-185.

* cited by examiner

*Primary Examiner* — James Zurita
(74) *Attorney, Agent, or Firm* — Workman Nydegger

(57) ABSTRACT

Displaying information about a physical object. Input is received at an interactive surface. The input includes a first physical object being placed on the interactive surface. The first physical object is detected. This includes detecting identifying information about the first physical object. Information is displayed about the first physical object on the interactive surface.

22 Claims, 3 Drawing Sheets

VIRTUAL FEATURES OF PHYSICAL ITEMS

BACKGROUND

Background and Relevant Art

When purchasing goods and services, a purchaser at a purchase location has a limited number of ways to ascertain information about goods or services to be purchased. For example, if a good to be purchased is packaged in a box, the box may include information about certain features about the good. Alternatively, a brochure may be provided to the purchaser which includes various features of goods or services to be purchased. Boxes and brochures can be expensive to provide, and because of size limitations they are only able to provide a limited amount of information at any given time.

A purchaser may also discover information about goods or services to be purchased by asking an employee at the purchase location. However, the purchaser's ability to obtain relevant and factual information may be limited by the employees ability to provide such information. Additionally, during busy periods at the purchase location, employees may be difficult to locate or to converse with.

Other self help methods exist, but the self help methods as presently implemented are limited in their ability to provide information. For example, many purchase locations include bar code scanners were a purchaser can scan the barcode stock keeping unit (SKU) number of an item. However, these bar code scanners are typically limited in the information provided and are typically limited to a general description which includes the manufacturer of the good, the style of the good, and the price for the good. However, the information presented it is not interactive and additional information cannot be obtained other than the limited descriptive information provided.

The subject matter claimed herein is not limited to embodiments that solve any disadvantages or that operate only in environments such as those described above. Rather, this background is only provided to illustrate one example of a technology area where some embodiments described herein may be practiced.

BRIEF SUMMARY

In one embodiment described herein a method for displaying information about a physical object is described. The method may be practiced in a computing environment including an interactive surface interface. The method includes receiving input at an interactive surface. The input includes a first physical object being placed on the interactive surface. The first physical object is detected. This includes detecting identifying information about the first physical object. Information is displayed about the first physical object on the interactive surface.

Other embodiments implement the preceding method in computer systems or in computer program products including computer readable media. Other systems and methods may also be implemented.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4 illustrates an interactive surface and physical objects and comparison information about the physical objects being displayed on the interactive surface, while

DETAILED DESCRIPTION

The present invention extends to an interactive interface that allows a purchaser to obtain information about a physical object by interacting with the interface. The embodiments of the present invention may comprise a special purpose or general-purpose computer including various computer hardware, as discussed in greater detail below.

Figure 1:
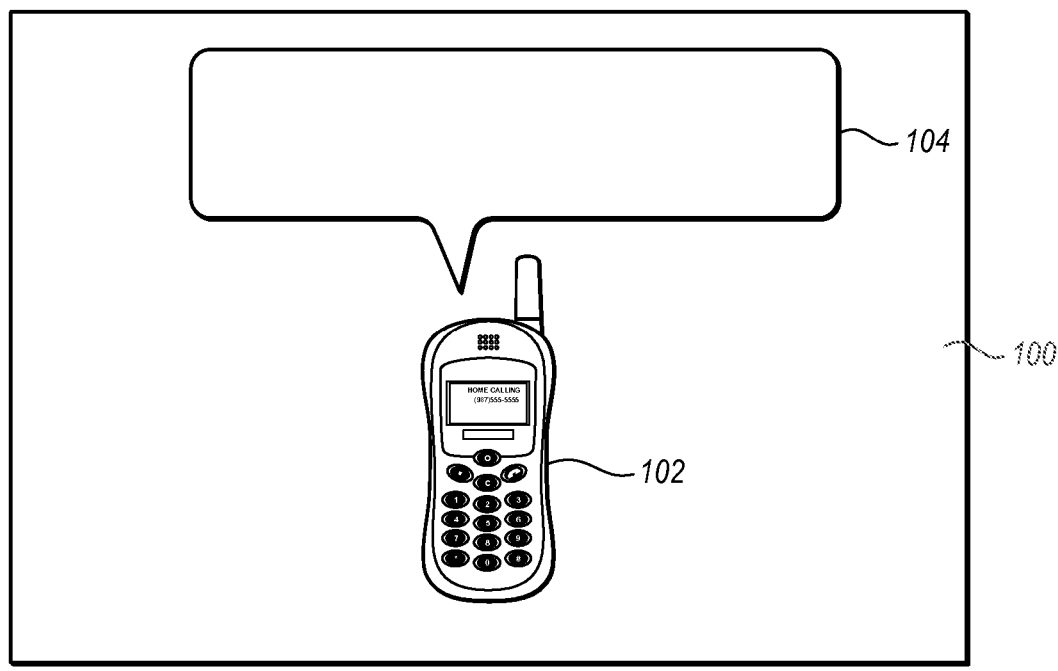
FIG. 1 illustrates an interactive surface and a physical object on the interactive surface, and information about the physical object being displayed on the interactive surface.

One embodiment described herein facilitates a purchaser obtaining information about a physical object. The purchaser places a physical object on an interactive surface. The interactive surface includes sensors for detecting the physical object on the interactive surface. The interactive surface may also be able to detect identifying information about the physical object. For example, the interactive surface may include bar code sensors for sensing bar codes on the physical objects. Alternatively, the interactive surface may include Radio Frequency Identifier (RFID) sensors for detecting RFID tags which include identifying information identifying the physical object. Information about the physical object can then be displayed on the interactive surface. The information presented may be interactive to allow a purchaser to obtain additional or more customized information. Additionally, in one embodiment, the information can be specifically directed to a particular portion of the physical object to help identify and describe features of the physical object. Further still, in one embodiment, physical objects can be compared by placing two or more physical objects on the interactive surface Referring now to FIG. 1, an illustrative embodiment is illustrated. FIG. 1 illustrates an interactive surface 100. The interactive surface 100 may include functionality for detecting a physical object 102. When the interactive surface 100 detects the physical object 102, information about the physical object 102 can be presented on the interactive surface 100 as illustrated at 104.

Various types of information can be presented. For example, information 104 may include descriptive information describing features of the physical object 102. Illustratively, the features information of the physical object 102 may include information about the capabilities of the physical object 102. The features information may include information such as physical dimensions. The features information may include information such as compatible operating environments, accessories, or other uses. Other information may alternatively or additionally be included.

The information 104 may include ratings information. For example, reviews or comments by ratings organization or by other users may be included in the information 104. This may allow a purchaser to obtain additional information about a physical item 102 where the information has been evaluated by other users or organizations.

The information 104 may further include advertisement information. For example, the information 104 may include textual information highlighting desirable features of the physical object 102. Alternatively, in some embodiments, the information 104 may include a commercial advertisement from an advertising campaign. Thus for example, when a purchaser has previously seen a commercial advertisement on television, the purchaser can place a physical object 102 that the purchaser believes to be the physical object previously seen in the commercial advertisement on the interactive surface 100. The interactive surface 100 can then detect the physical object 102 and display a commercial advertisement. When the purchaser sees that the commercial advertisement is the same commercial advertisement previously seen, the purchaser can be assured that they have selected the physical item that was previously seen in the commercial advertisement.

In yet another embodiment, after a consumer has purchased a product, the user can return to the interactive surface 100 to buy accessory products. The interactive surface 100 can detect the physical object 102 and may be able to detect who the purchaser is, what services they bought originally, what features they use more than others, and be able to target rebates and discount based on that information. Additionally, the interactive surface can make specific suggestions to the customer on what products and/or services would be most useful based on their usage of the detected physical object 102 or related purchase history.

Figure 2:
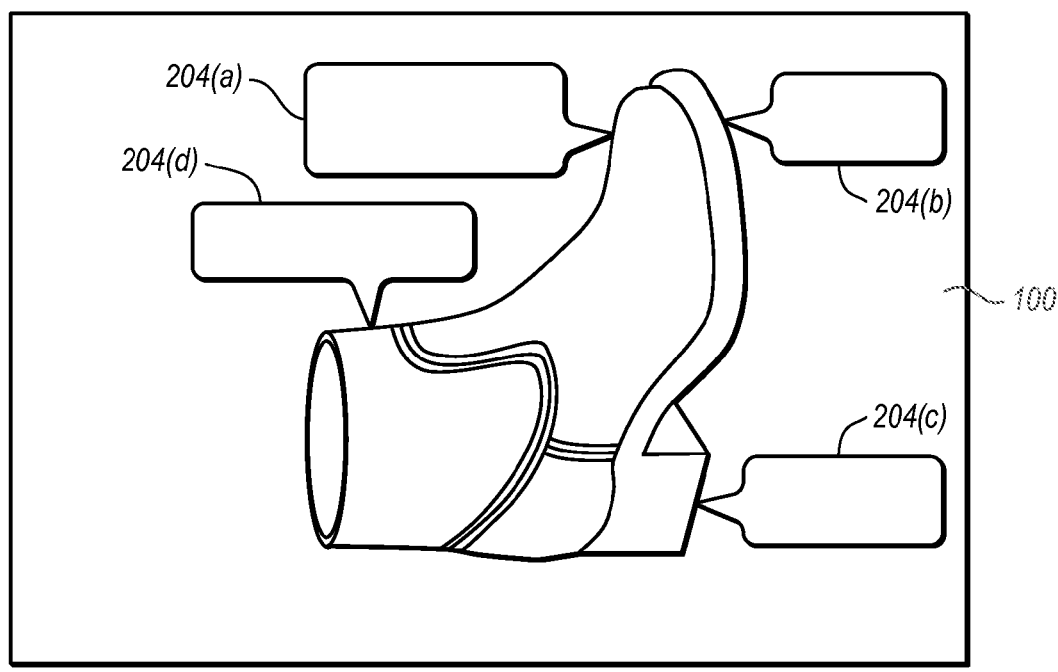
FIG. 2 illustrates an interactive surface and a physical object on the interactive surface, and information in call-outs to features about the physical object being displayed on the interactive surface.

Embodiments may include functionality for specifically pointing to features of a physical object and providing contextual information about those features. For example, FIG. 2 illustrates the interactive surface 100. FIG. 2 further illustrates a physical object 202. When the physical object 202 is placed on the interactive surface 100, information about the physical object may be presented in callouts 204(a), 204(b), 204(c), and 204(d). The call outs may include feature information for a particular portion of a physical object, and may point to the particular portion of the physical object 202. For example, FIG. 2 illustrates that the physical object 202 is a shoe. Call out 204 (c) points to the heels of the shoe 202. The call out 204 (c) may include feature information describing features of the heel of the shoe 202. While in the example illustrated in FIG. 2, the call outs are illustrated as a bubble call outs, other call outs may be used. In particular, any appropriate call out that identifies a portion of the physical object 202 and is able to provide additional features about the identified portion of the physical object 202 may be suitable. Additionally, in one embodiment, callouts can be interactive pieces of a user interface that can be moved around, manipulated, resized, etc.

Notably, for the interactive surface 100 to be able to correctly identify portions of the physical object 202, the interactive surface 100 includes functionality for determining the position and orientation of the physical object 202. For example, if the interactive surface 100 uses a barcode placed on the physical object 202 to identify the physical object 202, the position of the barcode may provide a sufficient amount of information for determining position and orientation information about the physical object 202. Thus, in one embodiment, each sample of the same physical object may have the barcode placed in a consistent location. In alternative embodiments, the physical interactive surface 100 may include touch sensors which allow the interactive surface 100 to determine the shape of the physical object 202 according to the portions of the physical object 202 in contact with the interactive surface 100. Position and orientation information may be determined based on this touch feedback.

Additionally, embodiments are not limited to allowing for a single orientation of the physical object 202. For example, in one alternative embodiment, the same physical object 202 may be placed down in a variety of ways create various experiences depending on the physical object's dimensional orientation. Illustratively, a physical object 202 may be placed down on various sides, upside down, on it's side, etc. In one embodiment, each side has a unique tag to provide optimized information for a particular view.

Referring once again to FIG. 1, the information 104 may include a demonstration of features are characteristics of the physical object 102. For example, suppose that the physical object 102 is a musical compact disc. The information 104 may include textual or graphical information identifying musical works on the musical compact disc. In addition, the information 104 may include an audio sample of one or more of the works on the musical compact disc.

Similarly, if the physical object 102 is a DVD, the information 104 may include a clip of one or more scenes included on the DVD. In yet another similar embodiment, if the physical object 102 is a game cartridge for a video game, the interactive service 100 may display scenes from the video game scenarios or may alternatively display an interactive user interface which allows a purchaser to play a demo version of the video game prior to making purchasing decisions.

Figure 3:
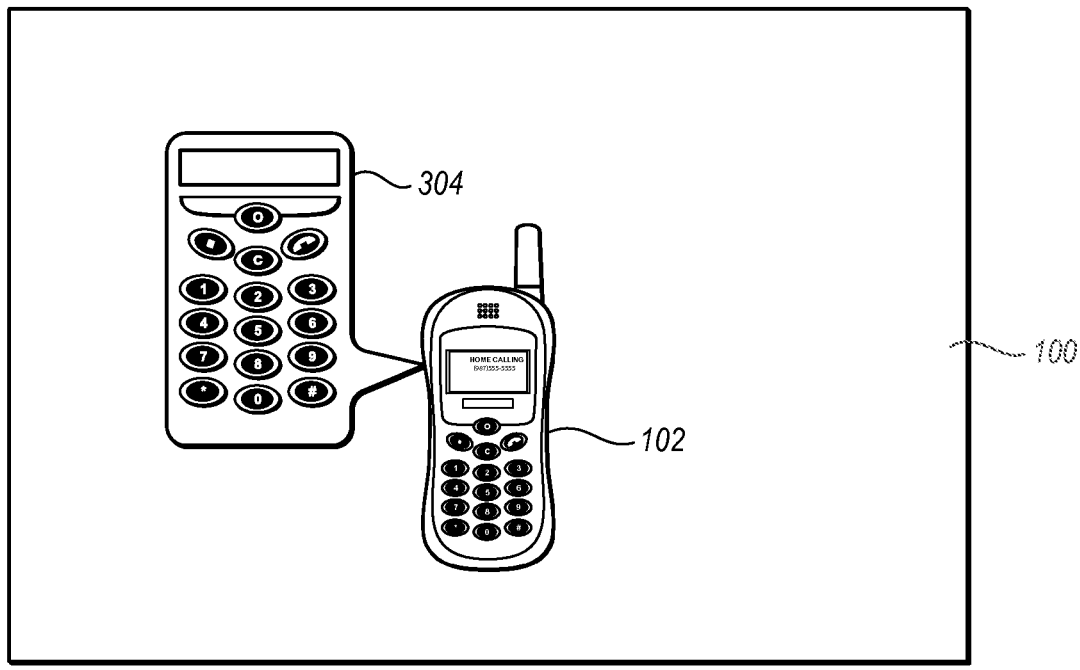
FIG. 3 illustrates an interactive surface and a physical object on the interactive surface, and a virtual interface for the physical object.

Referring now to FIG. 3, a generalized example of a virtual user interface is illustrated. In the example illustrated in FIG. 3, the interactive surface 100 may detect a physical object 102. The interactive surface 100 may then display a virtual user interface 304 which allows a purchaser to test functionality of the physical object 102. The virtual interface 304 may be a virtual representation of a user interface of the physical object 102, or a virtual representation of an interface of another item used with the physical object 102. For example, FIG. 3 illustrates that the physical object 102 is a cellular telephone and the virtual user interface 304 is a virtual user interface of the cellular telephone 102. Alternatively, if the physical object 102 is a video game as described above, the virtual interface 304 may be a virtual interface of a game consoles used to play the video game.

Attention is now directed again to the example where the virtual interface is a virtual interface of the detected physical object 102. As an example, the physical object 102 may be a nonworking display version of the physical object 102. For example, cellular telephones are often sold based on a nonworking display of the cellular telephone. Thus, if a purchaser desires to test the features of a cellular telephone prior to purchase, difficulties may be encountered in that physically available examples do not include working functionality to demonstrate the features. However, in one embodiment the nonworking display model may be placed on the interactive surface 100 where a virtual interface 304 is displayed. A purchaser can then test features of working models of the cellular telephone.

Notably, in one embodiment, the virtual interface 304 may be used for educational purposes. For example, the virtual interface may allow a user to watch feature specific tutorials for a product. In some embodiments, the user may then be able to interact with the virtual interface 304 as part of the education experience teaching how to use the particular product.

Figure 4:
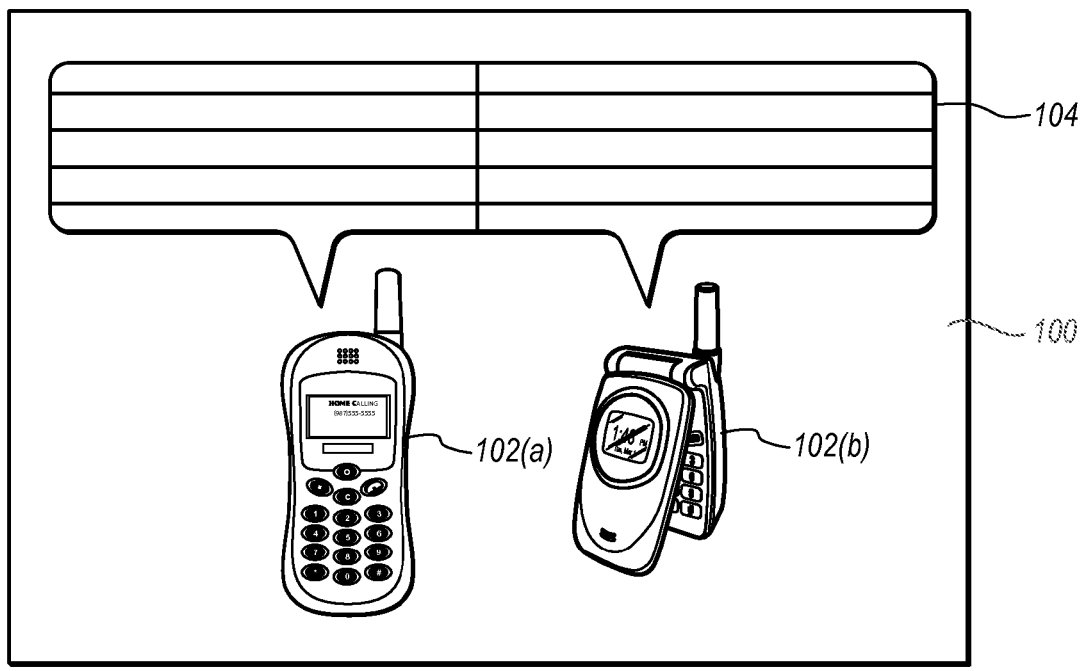

Referring now to FIG. 4, another embodiment is illustrated. In the embodiment illustrated in FIG. 4, two or more physical objects 102 (a) and 102 (b) can be compared using the interactive surface 100. For example, the interactive surface can detect the two physical objects 102 (a) and 102 (b). The information 104 displayed includes comparative information about the two physical objects 102 (a) and 102 (b). Comparative information may be displayed in a number of different ways. The example illustrated in FIG. 4 shows that the comparative information 104 is displayed in a table format. This format may facilitate the comparison of capabilities of similar features such that a direct comparison of one physical object to another physical object can be facilitated to facilitate purchaser purchasing decisions.

Figure 5:
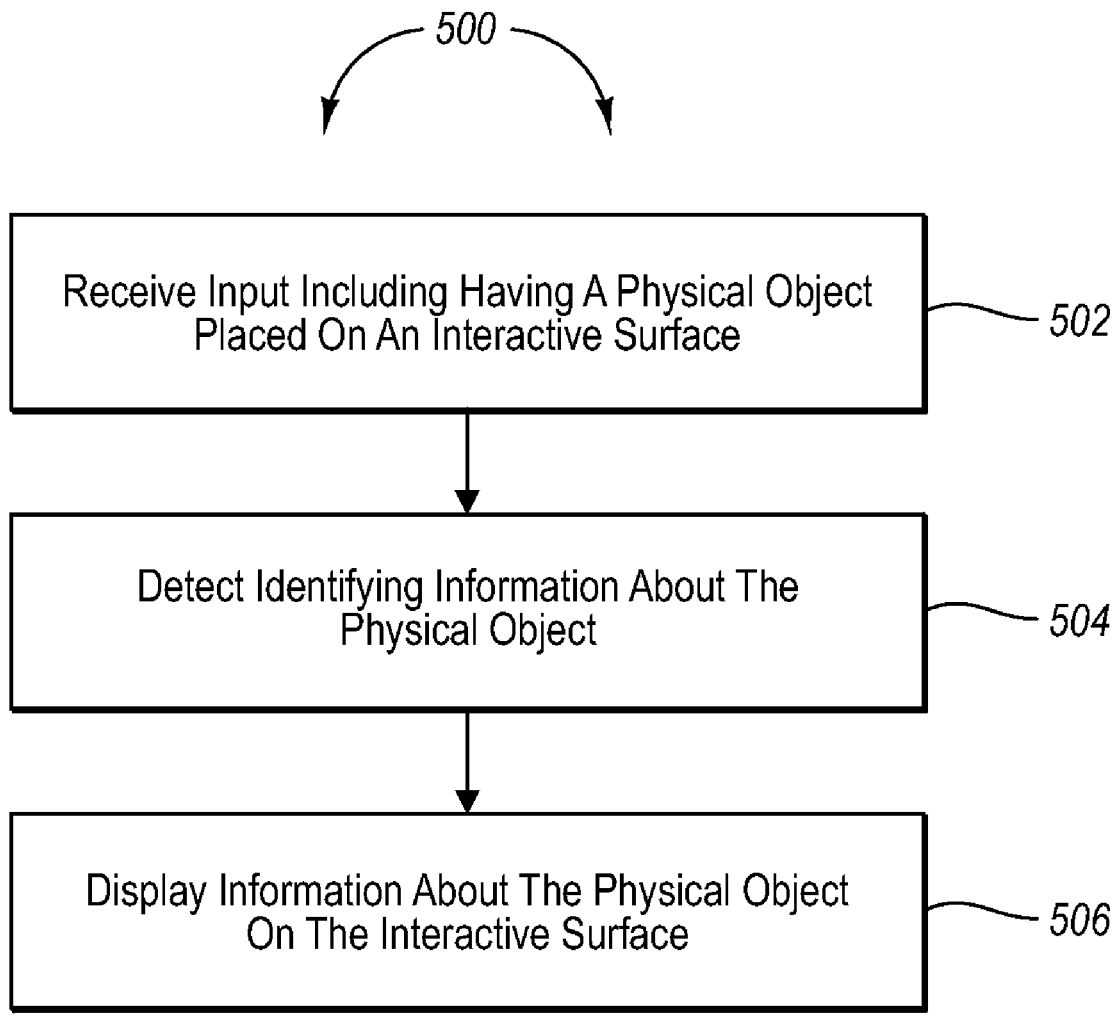
FIG. 5 illustrates a flow diagram of elements associated with displaying information about physical objects on an interactive surface.

Referring now to FIG. 5, an example method 500 illustrating various features is shown. The method 500 includes various acts for providing information associated with physical objects. The method 500 includes receiving input at an interactive surface, the input including a physical object being placed on the interactive surface (act 502). An example of this is illustrated in FIG. 1 where a physical object 102 is placed in the interactive surface 100.

The method 500 further includes detecting identifying information about the physical object (act 504). As explained previously, this may be accomplished in a number of different ways, including detecting a barcode tag or a RFID tag.

The method 500 further includes displaying information about the physical object on the interactive surface. Displaying information about the physical object may be accomplished in a number of different ways. As discussed in conjunction with the description of FIG. 1, displaying the information 104 may include displaying textual descriptive information about the physical object 102. Alternatively, displaying information 104 about the physical object 102 may include playing a video about the physical object.

In one embodiment, callouts describing features of the first physical object may be displayed, as illustrated in FIG. 2. The callouts may point to specific portions of the physical object describing information about those portions of the physical object.

In another embodiment, displaying information about the first physical object on the interactive surface (act 506) may include displaying a virtual representation of the first physical object including a virtual interface of the object. For example, FIG. 3 illustrates a virtual interface 304 of the physical object 102 being displayed. As described previously, this allows a purchaser to virtually test the physical object 102 without needing a working example of the physical object 102.

In yet another embodiment, displaying information about the physical object on the interactive surface may include displaying ratings or reviews for the first physical object. As explained previously, users or ratings organizations may submit review information which can be included in the information displayed.

The method 500 may be implemented such that displaying information about the first physical object on the interactive surface includes displaying an advertisement or commercial for the physical object. For example, a print advertisement or video commercial about the physical object may be displayed on the interactive surface.

The method 500 may further include playing a demo version of media stored on the first physical object. For example, the demo version a music clip or a video clip of a work stored on the first physical object. This may be implemented when the physical object is a musical CD, DVD, cassette tape, video tape, or other media storing device. While the clip is not necessarily read directly from the physical object, and may be read from storage at the interactive surface, the clip nonetheless is an example of media that may be obtained by purchasing the physical object.

Similarly, the method 500 may include embodiments where the demo version is sample portion of a video game. Illustratively, a user may be able to place a video game cartridge on the interactive surface. As illustrated in FIG. 3, a virtual interface 304 may be provided which would allow the user to play the video game using the virtual interface 304. Other embodiments allow the use of actual interfaces to be included at the interactive surface to allow for playing the video game sample.

The method 500 may further include receiving user input where the user input includes interaction from a user with the information about the physical object. In response to the user input, additional information is displayed about the physical object. In another embodiment, the method 500 may include receiving input at the interactive surface, where the input includes a second physical object being placed on the interactive surface. The second physical object is detected, including identifying information about the second physical object. Information is displayed on the interactive surface comparing the first physical object to the second physical object.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of providing information associated with physical objects, the method comprising:
   receiving input at an interactive surface, the input comprising a first physical object being placed on the interactive surface;
   detecting the first physical object, including detecting identifying information about the first physical object;
   displaying information about the first physical object on the interactive surface;
   receiving new input at the interactive surface, the new input comprising a second physical object being placed on the interactive surface;
   detecting the second physical object, including detecting identifying information about the second physical object; and
   displaying information on the interactive surface comparing the first physical object to the second physical object.

2. The method of claim 1, further comprising:
   receiving user input, the user input comprising interaction from a user with the information about the first physical object; and
   in response to the user input, displaying additional information about the first physical object.

3. The method of claim 1, wherein displaying information about the first physical object on the interactive surface comprises displaying a video about the first physical object.

4. The method of claim 1, wherein displaying information about the first physical object on the interactive surface comprises displaying callouts describing features of the first physical object, wherein the callouts point to specific portions of the first physical object described about those portions in the information about the first physical object.

5. The method of claim 1, wherein displaying information about the first physical object on the interactive surface comprises displaying a virtual representation of the first physical object including a virtual interface of the object.

6. The method of claim 1, wherein displaying information about the first physical object on the interactive surface comprises displaying at least one of ratings or reviews for the first physical object.

7. A computer system for displaying information about physical objects, the computer system comprising:
   a processor, a computer memory coupled to the processor, the computer memory comprising computer executable instructions that when executed by the processor cause the processor to perform the following:
   receive input at an interactive surface, the input comprising a first physical object being placed on the interactive surface;
   detect the first physical object, including detecting identifying information about the first physical object;
   display information about the first physical object on the interactive surface; receiving new input at the interactive surface, the new input comprising a second physical object being placed on the interactive surface;
   detecting the second physical object, including detecting identifying information about the second physical object; and
   displaying information on the interactive surface comparing the first physical object to the second physical object.

8. The computer system of claim 7, wherein the computer memory further comprises computer executable instructions that when executed by the processor cause the processor to:
   receive user input, the user input comprising interaction from a user with the information about the first physical object; and
   in response to the user input, display additional information about the first physical object.

9. The computer system of claim 7, wherein displaying information about the first physical object on the interactive surface comprises displaying a video about the first physical object.

10. The computer system of claim 7, wherein displaying information about the first physical object on the interactive surface comprises displaying callouts describing features of the first physical object, wherein the callouts point to specific portions of the first physical object described about those portions in the information about the first physical object.

11. The computer system of claim 7, wherein displaying information about the first physical object on the interactive surface comprises displaying a virtual representation of the first physical object including a virtual interface of the object.

12. The computer system of claim 7, wherein displaying information about the first physical object on the interactive surface comprises displaying at least one of ratings or reviews for the first physical object.

13. In a computing environment, a computer readable storage medium storing computer executable instructions which, when executed by a computing processor, implement the following acts:
   receiving input at an interactive surface, the input comprising a first physical object being placed on the interactive surface;
   detecting the first physical object, including detecting identifying information about the first physical object;
   displaying information about the first physical object on the interactive surface; receiving new input at the interactive surface, the new input comprising a second physical object being placed on the interactive surface;
   detecting the second physical object, including detecting identifying information about the second physical object; and
   displaying information on the interactive surface comparing the first physical object to the second physical object.

14. The computer readable medium of claim 13, wherein the computer readable medium is system memory.

15. The computer readable medium of claim 13, wherein the computer readable medium further comprises computer executable instructions that when executed by the processor cause the processor to:
   receive user input, the user input comprising interaction from a user with the information about the first physical object; and
   in response to the user input, display additional information about the first physical object.

16. The computer readable medium of claim 13, wherein displaying information about the first physical object on the interactive surface comprises displaying a video about the first physical object.

17. The computer readable medium of claim 13, wherein displaying information about the first physical object on the interactive surface comprises displaying callouts describing features of the first physical object, wherein the callouts point to specific portions of the first physical object described about those portions in the information about the first physical object.

18. The computer readable medium of claim 13, wherein displaying information about the first physical object on the interactive surface comprises displaying a virtual representation of the first physical object including a virtual interface of the object.

19. In a computing environment that includes one or more computing systems having one or more computing processors, a method of providing information associated with physical objects, the method comprising:
- receiving input at an interactive surface, the input comprising a physical object being placed on the interactive surface in a first dimensional orientation;
- detecting the first physical object, including detecting identifying information about the first physical object and the first dimensional orientation in which the object was placed on the interactive surface;
- presenting a first display of one or more first items of information associated with the first physical object on the interactive surface, wherein the display of the information associated with the first physical object is dependent upon the first dimensional orientation in which the physical object was placed on the interactive surface.

20. The method of claim 19, wherein displaying information about the physical object on the interactive surface comprises displaying callouts describing features of the physical object, wherein the callouts point to specific portions of the physical object described about those portions in the information about the physical object.

21. The method of claim 19, wherein the method further includes:
- receiving new input at the interactive surface, indicating that the physical object is now placed on the interactive surface in a second dimensional orientation; and
- presenting a new display of one or more second items of information associated with the physical object, based on the second dimensional orientation of the physical object on the interactive surface.

22. The method of claim 21, wherein the first one or more items and the second one or more items of the information associated with the first physical object are the same.

* * * * *